United States Patent [19]

Raguideau et al.

[11] Patent Number: 5,000,769
[45] Date of Patent: Mar. 19, 1991

[54] SYSTEM FOR VENTILATING A RAIL TRACTION MOTOR AND FOR DYNAMICALLY PURIFYING THE VENTILATION AIR

[75] Inventors: Jean-Luc Raguideau, Paris; Jean-Louis Marichez, Conflans Saint-Honorine; Jean-Pierre Gaignier; Lucien Piguel, both of Ornans, all of France

[73] Assignee: Brevet, Paris, France

[21] Appl. No.: 509,451

[22] Filed: Apr. 16, 1990

[30] Foreign Application Priority Data

Apr. 14, 1989 [FR] France ............................... 89 04971

[51] Int. Cl.⁵ ............................................ B01D 45/12
[52] U.S. Cl. .................................... 55/406; 415/121.2
[58] Field of Search ................. 55/406, 290; 415/121.2

[56] References Cited

U.S. PATENT DOCUMENTS 2,601,907  7/1952  Burrows et al. ...................... 55/406

FOREIGN PATENT DOCUMENTS 1337644  8/1963  France .
1541898  9/1968  France .
13930    of 1915  United Kingdom ................. 55/406
977042   12/1964  United Kingdom .
1433596  4/1976  United Kingdom .

Primary Examiner—Bernard Nozick
Attorney, Agent, or Firm—Sughrue, Mion, Zinn Macpeak & Seas

[57] ABSTRACT

A system for ventilating a rail traction motor and for dynamically purifying the ventilation air, the system comprising a centrifugal fan (1) having radial blades (2) surrounded by a circular housing (3) and delivering air to the motor, and dynamic filter means on the path of the air delivered by the fan. The system includes a plane sheet (4) pierced by peripheral through openings (5) forming a diffusing screen and dividing the inside volume of the circular housing into an upstream chamber (6) connected to the air inlet of the fan, and a downstream chamber (7) connected to its outlet leading to the motor, an exhaust outlet (8) for exhausting impure air, the exhaust outlet being in the form of a sector on the periphery of the upstream chamber, and a separator element (9) disposed facing the opening and forming an obstacle to deflect air streams close to the blades of the fan towards a take-up section close to the exhaust opening.

10 Claims, 3 Drawing Sheets

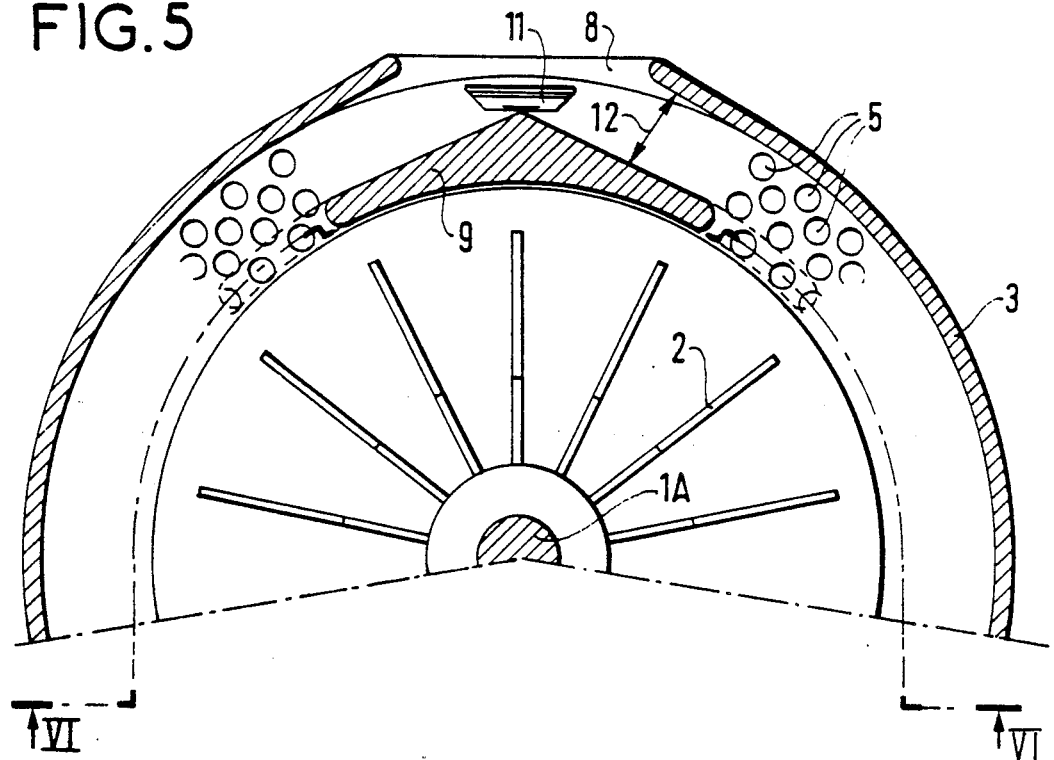
FIG.5
FIG.6
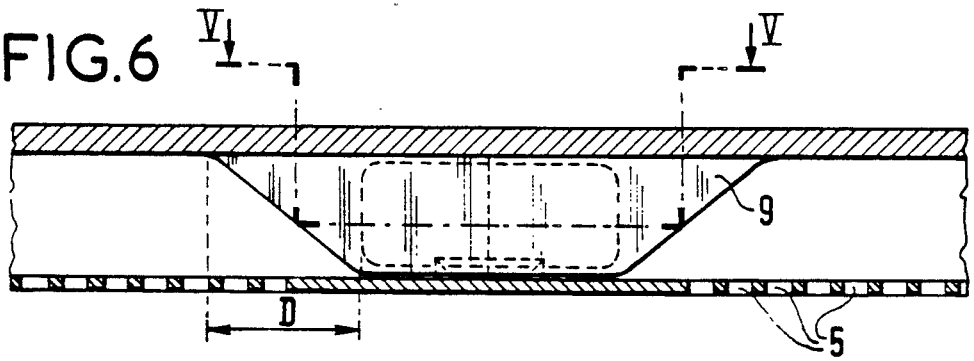
FIG.7
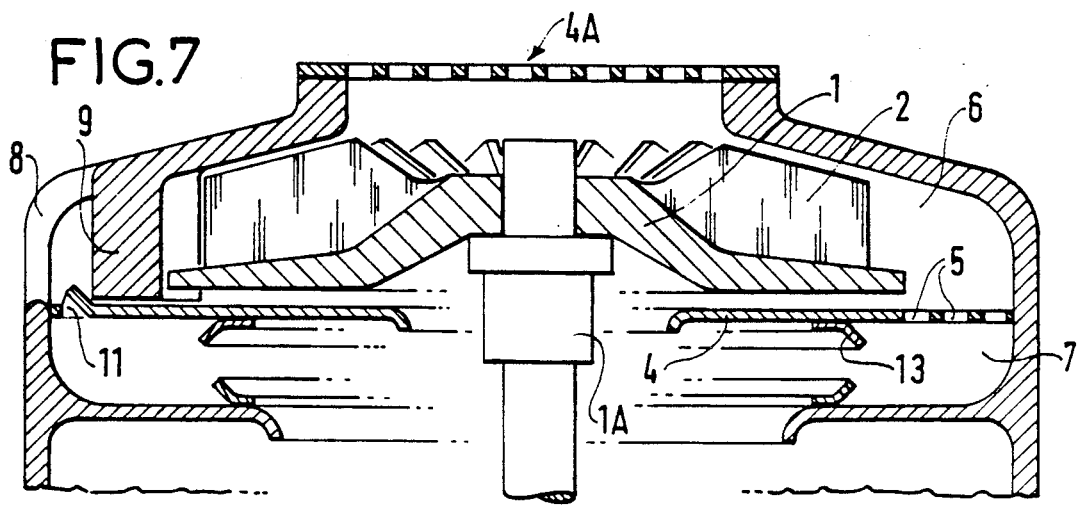

SYSTEM FOR VENTILATING A RAIL TRACTION MOTOR AND FOR DYNAMICALLY PURIFYING THE VENTILATION AIR

The present invention provides a system for ventilating a rail traction motor and for dynamically purifying the ventilation air, the system comprising a centrifugal fan having radial blades surrounded by a circular housing and delivering air to the motor, dynamic filter means on the path of the air delivered by the fan, and a plane sheet pierced by peripheral through openings forming a diffusing screen and dividing the inside volume of the circular housing into an upstream chamber connected to the air inlet of the fan, and a downstream chabmer connected to its outlet leading to the motor; as described in Document FR-A-1 541 898.

Proposals have already been made in Document FR-A-1 037 867 to provide ventilation for motors and electrical machines in a locomotive by means of a centrifugal fan fed with air taken from the roof of the locomotive so as to contain less dust, with the air being delivered via a lateral chimney in the locomotive bodywork to a louver-type filter for eliminating the impurities entrained by the air such as water droplets, snowflakes, grains of sand, and dust. However, such purification is incomplete, and electrical machines which require ventilating with air that is completely pure require removable filters to be disposed upstream therefrom.

Such a ventilation system is complex, rather noisy, occupies a large volume inside the bodywork, thereby reducing the space available for other apparatus, gives rise to considerable head loss in the ventilation air circuit, and requires inspecting frequently.

An object of the present invention is to provide a ventilation system for a rail traction motor which is simple, quiet, compact, gives rise to moderate head loss only in the ventilation air circuit, and requires inspecting only at widely spaced apart time intervals. Another object of the invention is to make it possible, where appropriate, for the fan to be driven directly by the motor shaft and for the air to be taken from beneath the chassis of the locomotive, thereby avoiding relatively long inlet ducts leading to the motor, while nevertheless putting the motor into contact only with air that has been thoroughly purified.

The system of the invention is characterized in that it further comprises an exhaust outlet for exhausting impure air, the exhaust outlet being in the form of a sector on the periphery of the upstream chamber, and a separator element disposed facing the opening and forming an obstacle to deflect air streams close to the blades of the fan towards a take-up section close to the exhaust opening.

The system preferably satisfies at least one of the following characteristics:

the peripheral through openings in the plane sheet are holes pierced through the sheet;

the peripheral through openings in the plane sheet are disposed in the form of louvers;

it includes an orifice connecting the peripheral zone of the downstream chamber to the peripheral zone of the upstream chamber in the vicinity of the exhaust outlet for impure air;

the downstream chamber is provided with means for rectifying the peripheral flow of air towards an axial flow;

the downstream chamber is provided with a circumferential baffle on the path of the air going from its periphery towards the central zone;

the separator element is generally trapezoidal in shape, with its acute angles being on its side furthest from the diffusing screen;

the separator element is generally parallelepiped-shaped, with its acute angle furthest from the diffuser screen facing the inlet for rotating air;

it includes a ventilation air inlet opening beneath the chassis of the vehicle; and the fan is driven directly in one direction and/or the other of its two directions of rotation by the shaft of the traction motor.

Ventilation systems of the invention for the electrical motors of rail vehicles are described below by way of example and with reference to the figures of the accompanying drawings, in which:

FIG. 5 is a plan view of the air inlet side of the fan in the vicinity of the outlet for exhausting air charged with dust or droplets of moisture, corresponding to the line V—V in FIG. 6;

FIG. 6 is an elevation view of the same zone from inside the periphery of the system, with the diffuser screen being visible at the top of the figure; and FIG. 7 is a diametrical section through a system for ventilating and purifying air, and including a circumferential baffle in its downstream chamber.

Figure 1:
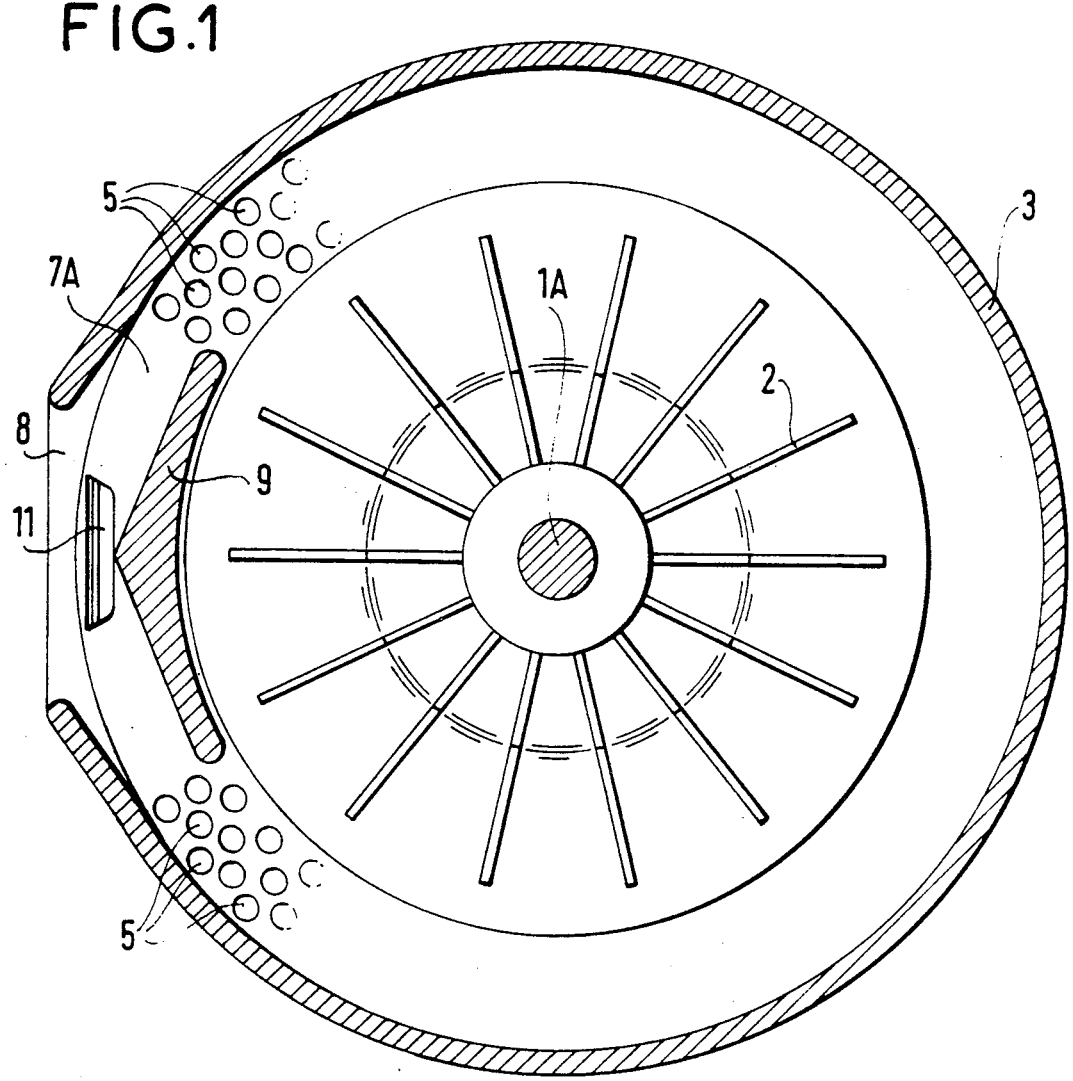
FIG. 1 is a plan view of the air inlet side of a system for ventilating and purifying air, and in which the metal sheet constituting the diffusing screen is a perforated sheet.
Figure 2:
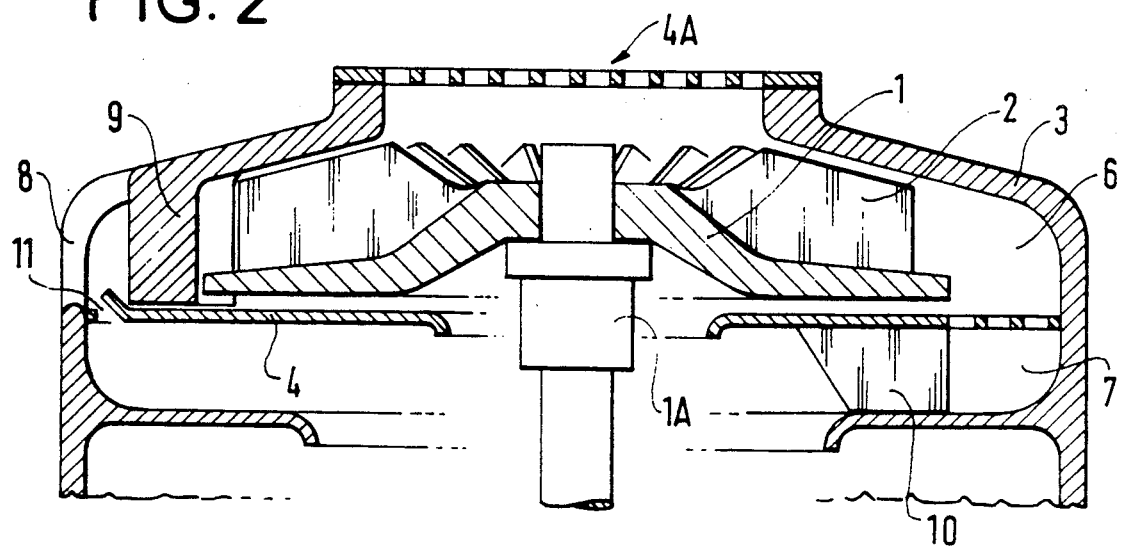
FIG. 2 shows the system of FIG. 1 in section on a diametrical plane.

In FIGS. 1 and 2, a centrifugal fan 1 having an axis 1A is provided with radial blades 2. It is enclosed in a circular housing 3. The inside volume of the housing is divided by a plane metal sheet 4 into an upstream chamber 6 containing the fan and connected by a protective grid 4A to an ambient air inlet opening (not shown), preferably disposed beneath the chassis of the vehicle, and a downstream chamber 7 itself connected to a duct (not shown) for feeding purified air to the electric motor to be cooled. Except for a solid sector constituting a mask 7A, the sheet 4 is pierced around its entire periphery by holes 5 providing communication between the upstream and downstream chambers.

Facing the sector 7A, the housing 3 is pierced by an outlet 8 for exhausting air charged with impurities, with the impurities being concentrated close to the fan housing by the effect of centrifugal force. Facing this opening, a separator element 9 which is generally trapezoidal or parallelepiped-shaped in elevation opposes the flow of air and directs the fraction of air which the centrifugal forces enriched in dust and droplets of moisture towards the exhaust opening.

The downstream chamber 7 is provided with blades 10 for rectifying the flow of air that reaches its outer zone via the holes 5, deflecting the air in an axial direction. An orifice 11 opening out into the outlet orifice for air charged with impurities serves to evacuate a fraction of still impure air reaching said chamber.

Figure 3:
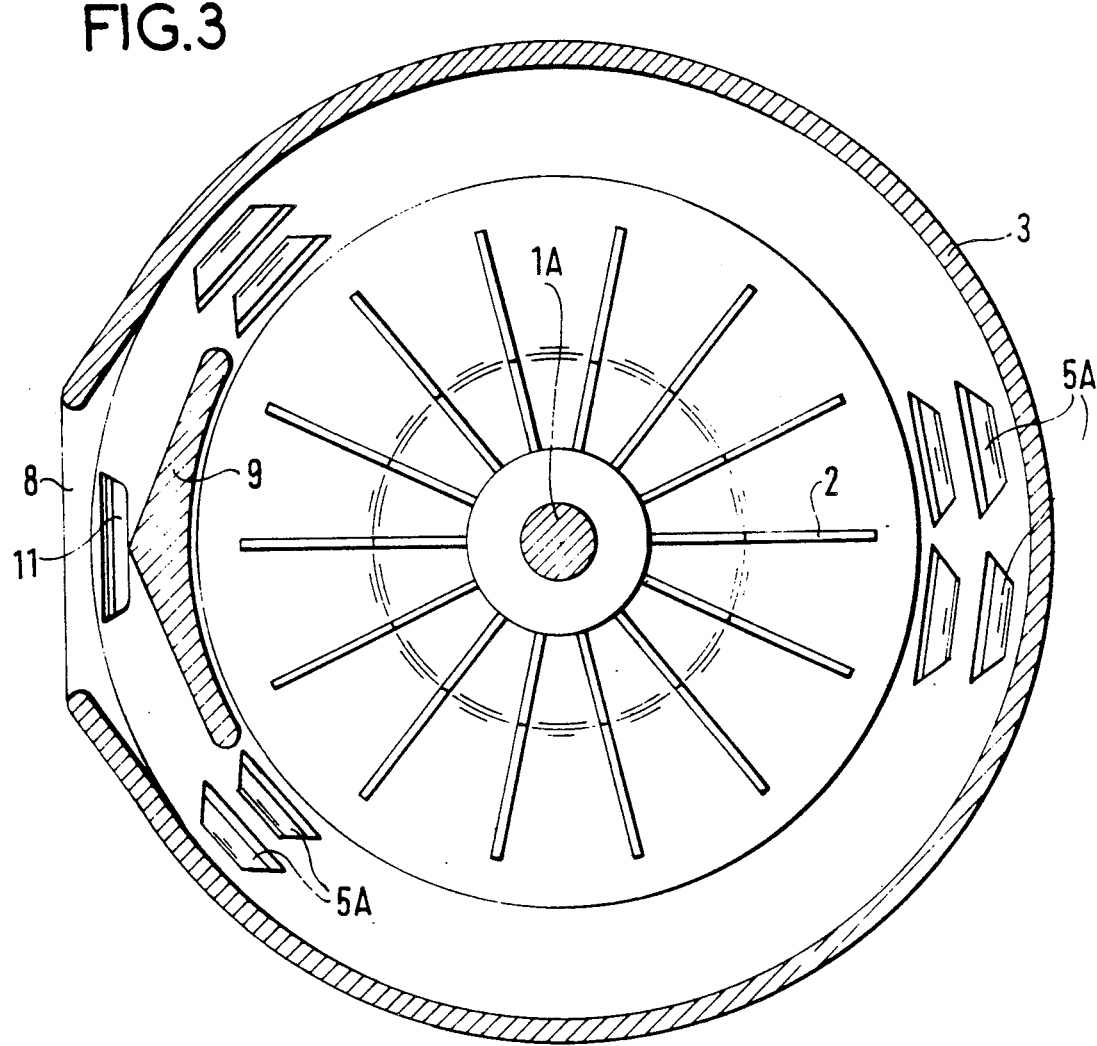
FIG. 3 is a plan view on the air inlet side of a system for ventilating and purifying air, and in which the sheet constituting the diffuser screen is in the form of an air-passing louver.
Figure 4:
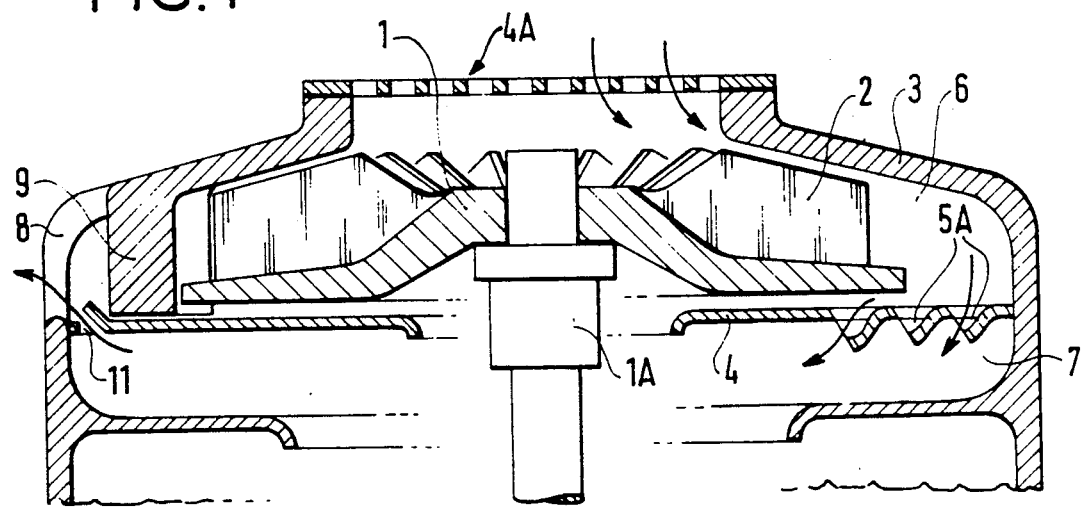
FIG. 4 shows the FIG. 3 system in diametrical section.

The system for ventilation and purification shown in FIGS. 3 and 4 is very largely similar to that shown in FIGS. 1 and 2, and identical items are not described again. However, the plane sheet 4 separating the upstream and downstream chambers is pierced around its periphery with openings 5A of the louver type (only some of which are shown) imparting a centripetal direction to air that penetrates therethrough.

FIGS. 5 and 6 show the sector of the opening 8 for exhausting air charged with dust or droplets of moisture, including a separator element 9 which is trapezoidal in shape facing said opening.

The trapezium has acute angles at its side furthest from the sheet separating the two chambers of the fan, thereby deflecting the streams of air delivered by the blades of the fan (shown at 2) towards the take-up section shown by double-headed arrow 12, and then towards the exhaust outlet 8. The opening 11 through the separation sheet 4 enables air still containing dust or droplets of moisture and flowing around the periphery of the downstream chamber to be likewise exhausted via the opening 8.

If the element 9 has a parallelepiped shape, then it has the same acute angle facing the streams of air delivered by the blades.

The offset of the separator as represented by the distance D in a plane perpendicular to the axis of the fan between the bottom and the top of the separator edge should be about 1.5 to 2 times the blade pitch in order to avoid excessive noise.

In the system of FIG. 7, the upstream chamber 6 of the fan is identical to that shown in FIGS. 1 and 2, and the separation sheet 4 is likewise pierced with holes 5 around its periphery. However, the downstream chamber 7 includes a circumferential baffle 13 setting up head loss on the air flow and facilitating the elimination of a peripheral fraction of air still containing dust or droplets of moisture via the opening 11.

We claim:

1. A system for ventilating a rail traction motor and for dynamically purifying the ventilation air, the system comprising a centrifugal fan (1) having radial blades (2) surrounded by a circular housing (3) and delivering air to the motor, dynamic filter means on the path of the air delivered by the fan, and a plane sheet (4) pierced by peripheral through openings (5) forming a diffusing screen and dividing the inside volume of the circular housing into an upstream chamber (6) connected to the air inlet of the fan, and a downstream chamber (7) connected to its outlet leading to the motor, the system being wherein it further comprises an exhaust outlet (8) for exhausting impure air, the exhaust outlet being in the form of a sector on the periphery of the upstream chamber, and a separator element (9) disposed facing the opening and forming an obstacle to deflect air streams close to the blades of the fan towards a take-up section close to the exhaust opening.

2. A system according to claim 1, wherein the peripheral through openings in the plane sheet are holes (5) pierced through the sheet.

3. A system according to claim 1, wherein the peripheral through openings in the plane sheet are disposed in the form of louvers (5A).

4. A system according to claim 1, wherein it includes an orifice (11) connecting the peripheral zone of the downstream chamber (7) to the peripheral zone of the upstream chamber (6) in the vicinity of the exhaust outlet (8) for impure air.

5. A system according to claim 1, wherein the downstream chamber is provided with means for rectifying the peripheral flow of air towards an axial flow (10).

6. A system according to claim 1, wherein the downstream chamber is provided with a circumferential baffle (13) on the path of the air going from its periphery towards the central zone.

7. A system according to claim 1, wherein the separator element (9) is generally trapezoidal in shape, having an acute angle being on its side furthest from the diffusing screen.

8. A system according to claim 1, wherein the separator element (9) is generally parallelepiped-shaped having an acute angle furthest from the diffuser screen facing the inlet for rotating air.

9. A system according to claim 1, wherein the fan is driven directly by the motor shaft.

10. A system for ventilating a rail traction motor by purified air, said system comprising a centrifugal fan surrounded by a circular housing concentric to the rotation axis of the fan and partially enclosing said fan, an opening within a top of the circular housing serving as an inlet for the ambient air, a second opening in a bottom of the circular housing serving as an outlet for the purified air for flow towards the motor, a plane sheet disposed transversely with respect to the rotation axis of the fan intermediate of said top and bottom openings dividing the inside volume of the circular housing into an upstream chamber connected to the air inlet and including the fan, and into a downstream chamber connected to the outlet of the air to the motor, the plane sheet being pierced by a central hole communicating the upstream and downstream chambers and having openings situated at the external periphery of the plane sheet except for a sector, the housing having a side exhaust outlet to communicate the exterior of the housing and the part of the upstream chamber corresponding to the sector, said exhaust outlet serving for the exhaust of the impure air, a separator element being disposed in the sector facing the exhaust outlet but set back radially of said exhaust outlet towards the fan and forming a passage for the exhaust of impure air between the separator element and the housing leading to said housing side exhaust outlet.

* * * * *